United States Patent [19]

Rosenquist

[11] 4,381,358
[45] Apr. 26, 1983

[54] COPOLYESTER-CARBONATES CONTAINING ALIPHATIC DIOL CO-MONOMERS

[75] Inventor: Niles R. Rosenquist, Evansville, Ind.

[73] Assignee: General Electric Co., Mt. Vernon, Ind.

[21] Appl. No.: 312,318

[22] Filed: Oct. 16, 1981

[51] Int. Cl.³ .................................................. C08G 63/64
[52] U.S. Cl. ........................... 524/114; 260/DIG. 24; 524/128; 528/125; 528/128; 528/173; 528/176; 528/190; 528/191; 528/193; 528/194; 528/195
[58] Field of Search ............... 528/190, 191, 176, 193, 528/194, 195, 173, 125, 128; 524/114, 128; 260/DIG. 24

[56] References Cited

U.S. PATENT DOCUMENTS

| | | | |
|---|---|---|---|
| 3,030,331 | 4/1962 | Goldberg | 260/42 |
| 3,161,615 | 12/1964 | Goldberg | 528/195 |
| 3,169,121 | 2/1965 | Goldberg | 260/47 |
| 3,207,814 | 9/1965 | Goldberg | 528/195 |
| 3,879,348 | 4/1975 | Serink et al. | 260/47 X |
| 4,194,038 | 3/1980 | Baker et al. | 528/182 |
| 4,260,719 | 4/1981 | Ching | 528/191 |
| 4,260,732 | 4/1981 | Ching | 528/191 |
| 4,312,975 | 1/1982 | Salee | 528/176 |

Primary Examiner—Lester L. Lee
Attorney, Agent, or Firm—Martin B. Barancik; William F. Mufatti

[57] ABSTRACT

Copolyester-carbonate resins, and articles molded therefrom, exhibiting improved processability comprising the reaction product of; (i) at least one dihydric phenol; (ii) a carbonyl halide carbonate precursor; (iii) at least one difunctional carboxylic acid or a reactive derivative thereof; and (iv) at least one bishaloformate represented by the general formula

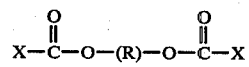

wherein X represents a halogen radical and R represents an alkylene radical, said bishaloformate being present in an amount effective to improve the processability of said resin.

28 Claims, No Drawings

COPOLYESTER-CARBONATES CONTAINING ALIPHATIC DIOL CO-MONOMERS

BACKGROUND OF THE INVENTION

Copolyester-carbonates are well known thermoplastic materials which, due to their many excellent properties, find use in many commercial and industrial applications. These copolyester-carbonates exhibit, for example, excellent properties of toughness, flexibility, impact resistance, and high heat distortion temperatures. The copolyester-carbonates, as described in U.S. Pat. No. 3,169,121, are generally prepared by the reaction of a dihydric phenol, a carbonate precursor, and a difunctional carboxylic acid. However, due to their relatively high melt viscosities the copolyester-carbonates are generally difficult to process, even at high temperatures. It would thus be very advantageous if a copolyester-carbonate could be provided which retained all of the other advantageous properties of copolyester-carbonates and was also easier to process, i.e., exhibited lower melt viscosities.

It is, therefore, an object of this invention to provide copolyester-carbonate resins which exhibit improved processability and which simultaneously retain all of the other advantageous properties of copolyester-carbonates.

DESCRIPTION OF THE INVENTION

It has been discovered that copolyester-carbonates can be obtained which exhibit improved processability while simultaneously generally retaining all of their other advantageous properties such as toughness, impact strength, flexibility, high heat distortion temperatures, and the like.

These copolyester-carbonate resins are comprised of the polymerized reaction products of (i) a dihydric phenol; (ii) at least one difunctional carboxylic acid or a reactive derivative thereof; (iii) a carbonyl halide carbonate precursor; and (iv) at least one particular bishaloformate, in minor amounts, represented by the general formula

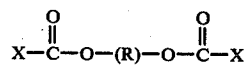   I.

wherein X represents a halogen radical and R represents an alkylene radical. The resultant copolyester-carbonates exhibit lowered melt viscosities, thereby rendering them easier to process, while simultaneously generally retaining the other advantageous properties of the copolyester-carbonate resins.

Briefly stated, the copolyester-carbonates of this invention comprise recurring carbonate groups

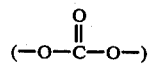

and carboxylate groups

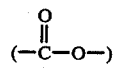

and aromatic carbocyclic groups in the linear polymer chain, in which at least some of the carboxylate groups and at least some of the carbonate groups are bonded directly to ring carbon atoms of the aromatic carbocyclic groups.

In the bishaloformates of Formula I the preferred halide radical is the chloride radical. The alkylene radicals represented by R are those alkylene radicals containing from 2 to about 20 carbon atoms. These alkylene radicals can be either straight chain alkylene radicals or branched alkylene radicals. If the alkylene radicals are branched chain alkylene radicals it is preferred that branching occur at the beta carbon atom. Preferred beta branched chain alkylene radicals are those wherein branching occurs at both beta carbon atoms when more than one beta carbon atoms is present. More preferred branched chain alkylene radicals are those where both beta carbon atoms, if more than one beta carbon atom is present, contain two branching groups.

Some illustrative non-limiting examples of straight chain alkylene radicals include ethylene, propylene, butylene, pentylene, octylene, amylene, and the like.

Some illustrative non-limiting examples of branched chain alkylene radicals include

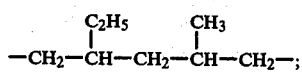

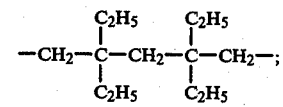

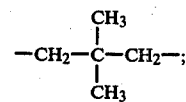

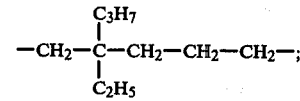

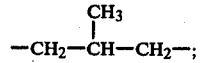

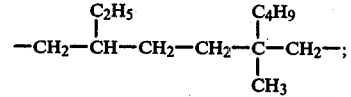

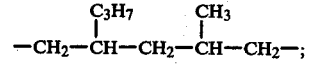

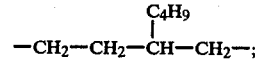

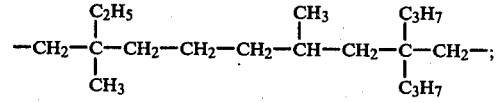

and the like.

The bishaloformates of Formula I are known compounds which are generally commercially available or which may be readily prepared by known methods.

One method of preparing these bishaloformates involves reacting a diol represented by the formula

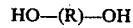

wherein R is as defined above, with a carbonyl halide represented by the formula

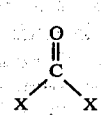

wherein X represents a halide radical, preferably the chloride radical. In this reaction one mole of the diol is reacted with two moles of the carbonyl halide to produce the bishaloformate of Formula I.

The dihydric phenols that may be employed in the practice of this invention are any of the well known dihydric phenols. Illustrative of these dihydric phenols are those disclosed in U.S. Pat. Nos. 3,028,365; 2,999,835; 3,030,331 and 3,169,121, all of which are hereby incorporated by reference.

In general these dihydric phenols are represented by the general formula

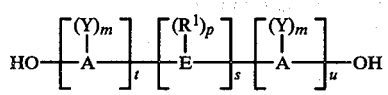

in which A ia an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur containing linkage such as sulfide, sulfoxide, sulfone, etc. In addition, E may be a cycloaliphatic group (e.g. cyclopentyl, cyclohexyl); a sulfur-containing linkage such as sulfide, sulfoxide or sulfone; an ether linkage; a carbonyl group; a tertiary nitrogen group; or a silicon-containing linkage such as silane or siloxy. $R^1$ is hydrogen or a monovalent hydrocarbon group such as alkyl (methyl, ethyl, propyl, etc.), cycloaliphatic (cyclopentyl, cyclohexyl, etc.), aryl phenyl, naphthyl, etc.), or aralkyl (benzyl, ethylphenyl, etc.). Y may be an inorganic atom such as chlorine, bromine, fluorine, etc; an inorganic group such as the nitro group, etc.; an organic group such as $R^1$ above, or an oxy group such as $OR^1$, it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one; s is either zero or one; and u may be any whole number including zero.

In the dihydric phenol compound represented by Formula II above, when more than one Y substituent is present, they may be the same or different. The same is true for the $R^1$ substituent. Where s is zero in Formula II and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Preferred dihydric phenols, for the purposes of the instant invention, are those represented by the general formula

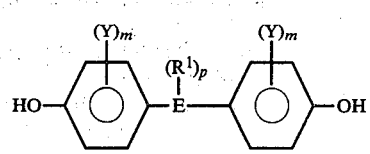

wherein Y, E, $R^1$, m and p are as defined above.

Some nonlimiting illustrative examples of the preferred dihydric phenols of Formula III include
2,2-bis-(4-hydroxphenyl)-propane;
1,1-bis-(4-hydroxyphenyl)-ethane;
1,3-bis-(3-methyl-4-hydroxyphenyl)-propane;
2,2-bis-(3-isopropyl-4-hydroxyphenyl)-propane;
2,2-bis-(4-hydroxyphenyl)-pentane; and the like.

Mixtures of two or more of the dihydric phenols can also be employed and where dihydric phenol is mentioned herein, mixtures of such material are considered to be included.

In general, any difunctional carboxylic acid conventionally used in the preparation of linear polyesters may be used for the preparation of the copolyester-carbonates of the present invention. Generally, the carboxylic acids which may be used include the aliphatic carboxylic acids, aliphaticaromatic carboxylic acids, and aromatic carboxylic acids. These acids are described in U.S. Pat. No. 3,169,121, which is hereby incorporated herein by reference.

The acids which may be used generally conform to the formula

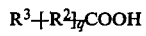

wherein $R^2$ is an alkylene, alkylidene or cycloaliphatic group in the same manner as set out above for E in Formula II; and alkylene, alkylidene or cycloaliphatic group containing ethylenic unsaturation; an aromatic radical such as phenylene, naphthylene, biphenylene, substituted phenylene, and the like; two or more aromatic groups connected through non-aromatic linkages such as those defined by E in Formula II; an aralkyl radical such as tolylene, xylene, and the like. $R^3$ is either a carboxyl or a hydroxyl group. The letter q is one where $R^3$ is a hydroxyl group and either zero or one where $R^3$ is a carboxyl group.

Preferred difunctional carboxylic acids are the aromatic dicarboxylic acids, i.e., those wherein q is 1, $R^3$ is a carboxyl group, and $R^2$ is an aromatic radical such as phenylene, naphthylene, biphenylene, substituted phenylene, and the like. The preferred aromatic carboxylic acids are those represented by the general formula

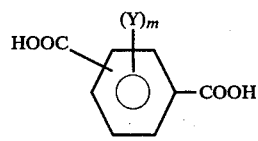

wherein Y and m are as defined above.

Mixtures of these difunctional carboxylic acids can also be employed and where difunctional carboxylic acid is mentioned herein, mixtures of such materials are considered to be included.

Preferred aromatic dicarboxylic acids, for the purposes of the present invention, are isophthalic acid, terephthalic acid, and mixtures of isophthalic acid and terephthalic acid. Particularly useful are mixtures of isophthalic acid and terephthalic acid. In these mixtures the weight ratio of terephthalic acid to isophthalic acid is generally in the range of from about 10:1 to about 1:10.

Rather than using the difunctional carboxylic acids per se it is possible, and sometimes even preferred, to utilize their reactive derivatives such as the acid halides. The acid chlorides are the preferred reactive derivatives of the difunctional carboxylic acids. Thus, for example, instead of using terephthalic acid, isophthalic acid, or mixtures of isophthalic acid and terephthalic acid; terephthaloyl chloride, isophthaloyl chloride, or mixtures of isophthaloyl chloride and terephthaloyl chloride may be employed.

The carbonyl halides utilized as the carbonate precursors in the instant invention are carbonyl chloride, carbonyl bromide, or mixtures thereof. Carbonyl chloride, also known as phosgene, is the preferred carbonyl halide.

The amount of the bishaloformate of Formula I employed is a processability improving amount. By processability improving amount is meant an amount effective to improve the processability of the copolyester-carbonate resin, i.e., reduce the melt viscosity of the resin, but insufficient to significantly adversely affect the other advantageous properties of the resin, particularly the heat distortion temperature. Generally, this amount ranges from about 1 to about 10 mole percent, based on the amount of dihydric phenol employed, and preferably from about 2 to about 8 mole percent. In general if the amount of the bishaloformate employed is less than about one mole percent there is no significant decrease in the melt viscosity, i.e., there is no significant improvement in the processability of the resin. If more than about 10 mole percent of the bishaloformate of Formula I is present the other properties of the resin, particularly the heat distortion temperature, begin to be significantly adversely affected.

The copolyester-carbonates of the instant invention, when a dicarboxylic acid or its reactive derivative is utilized, generally contain repeating units represented by the structures

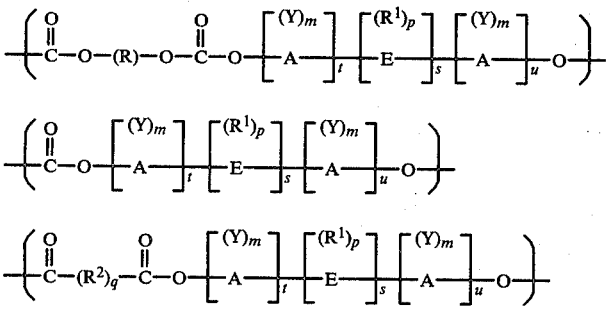

VI.

VII.

VIII.

wherein Y, R, R¹, R², A, E, t, s, u, m, p and q are as defined above. Structure VI will be present in minor amounts, depending upon the amount of the bishaloformate of Formula I utilized.

In the case where the preferred dihydric phenol of Formula III is employed, and wherein the dicarboxylic acid is a mixture of terephthalic acid and isophthalic acid (or in the case of the reactive derivatives thereof, isophthaloyl chloride and terephthaloyl chloride) the copolyester-carbonate resin contains repeating units represented by the structures

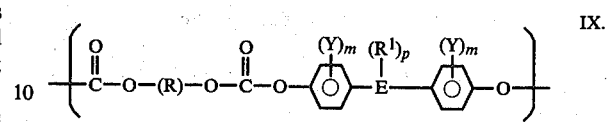

IX.

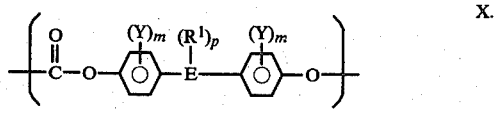

X.

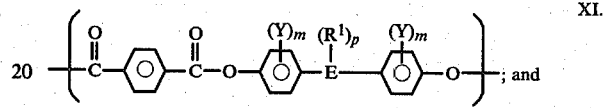

XI.

; and

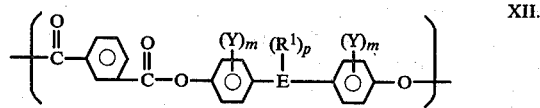

XII.

wherein Y, E, R¹, R, p and m are as defined above. Structure IX will be present in minor amounts, depending on the amount of the bishaloformate of Formula I employed.

It has been found that a copolyester-carbonate resin which contains structures IX-XII, i.e., one which is the reaction product of (i) at least one bishaloformate of Formula I; (ii) at least one dihydric phenol of Formula III; (iii) terephthalic acid or a reactive derivative thereof such as terephthaloyl chloride; (iv) isophthalic acid or a reactive derivative thereof such as isophthaloyl chloride; and (v) a carbonyl halide such as phosgene, exhibits particularly excellent all around properties such as impact strength, toughness, flexibility, high heat distortion temperatures, and ease of processability, and is particularly preferred.

One of the methods for preparing the copolyester-carbonates of this invention, when employing phosgene as the carbonyl halide carbonate precursor, involves first introducing the diacid chlorides and the bishaloformate, dissolved in a suitable solvent, into a reaction mixture containing a dihydric phenol, an acid acceptor, and a catalyst. Upon completion of the introduction of the diacid halides and the bishaloformate, preferably bischloroformate, phosgene is introduced into the reaction mixture in sufficient quantity to bring about reaction of substantially all of the remaining aromatic hydroxy groups. A particularly useful method, and one which results in copolyester-carbonates of generally excellent properties, involves mixing the compound or compounds of Formula I with the dicarboxylic acid or the reactive derivative thereof such as the diacid chloride and gradually adding this mixture to the reaction mixture before the introduction of phosgene has commenced.

A suitable acid acceptor may be either organic or inorganic in nature. A suitable organic acid acceptor is a tertiary amine and includes such materials as pyridine, triethylamine, dimethylaniline, tributylamine, and the like. The inorganic acid acceptor may be one which can be either a hydroxide, a carbonate, a bicarbonate, a phosphate, or an alkali or alkaline earth metal hydroxide.

The catalysts present in the reaction mixture may be any of the suitable catalysts that aid the polymerization reaction between the dihydric phenol, phosgene, and the dicarboxylic acid or its reactive derivative. Suitable catalysts include, but are not limited to, tertiary amines, secondary amines, quaternary ammonium compounds, quaternary phosphonium compounds, amidines, and the like.

Also present in the reaction mixture is a molecular weight regulator. These molecular weight regulators, or chain terminators, are generally well known and include such compounds as phenol, tertiarybutyl phenol, and the like.

The temperature at which the reaction proceeds may vary from below 0° C. to above 100° C. The reaction proceeds satisfactorily at temperatures from room temperature (25° C.) to 50° C. Since the reaction is exothermic, the rate of dicarboxylic acid or its reactive derivative addition, or the rate of phosgene addition may be used to control the reaction temperature.

The copolyester-carbonate resins of the instant invention may optionally contain various known and commonly utilized additives such as antioxidants; antistatic agents; glass fibers; impact modifiers; ultraviolet radiation absorbers such as the benzophenones and the benzotriazoles; fillers; plasticizers; mold release agents; hydrolytic stabilizers such as the epoxides disclosed in U.S. Pat. Nos. 3,489,716; 4,138,379 and 3,839,247, all of which are incorporated herein by reference; color stabilizers such as the organophosphites disclosed in U.S. Pat. Nos. 3,305,520 and 4,118,370, both of which are incorportade herein by reference; and flame retardants.

Some particularly useful flame retardants are the alkali metal salts of sulfonic acids and the alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are incorporated herein by reference.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates a copolyester-carbonate resin not containing the bishaloformate of the instant invention and thus falling outside the scope of the present invention.

To a reactor fitted with a mechanical agitator are charged 8 liters of deionized water, 16 liters of methylene chloride, 1,910 grams (8.36 moles) of bisphenol A, 24 milliliters of triethylamine, 3.4 grams of sodium gluconate, and 65 grams (0.43 mole) of p-tertiary butyl phenol molecular weight regulator. This mixture is stirred and to the stirred mixture are added, over a 15 minute period, a mixture of 890 grams of terephthaloyl chloride and 160 grams of isophthaloyl chloride as a 25 weight % solids solution in methylene chloride. During the acid chloride addition the pH is maintained in the range of 9.0 to 10.0 by the addition of 25% aqueous sodium hydroxide. The resulting reaction mixture is then phosgenated by the addition of phosgene at the rate of 36 grams per minute for 15 minutes with the pH controlled at 10.0 to 11 by the addition of the aqueous sodium hydroxide. After phosgenation is terminated 2 liters of methylene chloride are added, the brine layer is separated by centrifuge and the resin solution is washed with aqueous acid and with water. The resin is steam precipitated and dried in a nitrogen fluid bed at approximately 240° F. To this resin product are added minor amounts (about 0.1 part by weight per hundred parts by weight of resin) of a phosphite color stabilizer and an epoxy stabilizer. This stabilized resin product is then fed to an extruder operating at a temperature of about 600° F. to extrude the resin into strands and the extruded strands are chopped into pellets. The pellets are then injection molded at about 650° F. into test samples measuring about $2\frac{1}{2}''\times\frac{1}{2}''\times\frac{1}{8}''$.

The following examples illustrate copolyester-carbonate resins of the instant invention.

EXAMPLE 2

To a reactor fitted with a mechanical agitator are charged 8 liters of deionized water, 16 liters of methylene chloride, 1,9101 grams (8.36 moles) of bisphenol A, 24 milliliters of triethylamine, 3.4 grams of sodium gluconate and 65 grams (0.43 mole) of p-tertiary butyl phenol. This reaction mixture is stirred and to the stirred mixture are added, over a 15 minute period, a ternary mixture of 890 grams of terephthaloyl chloride, 160 grams of isophthaloyl chloride, and 38.2 grams (2 mole %) of the bischloroformate of 2,2-dimethyl propanediol as a 25 weight % solids solution in methylene chloride. During the addition of this ternary mixture the pH is maintained in the range of 9.0 to 10.0 by the addition of 25% aqueous sodium hydroxide. The resulting reaction mixture is then phosgenated by the addition of phosgene at the rate of 36 grams per minute for 15 minutes with the pH controlled at 10 to 11 by the addition of the aqueous sodium hydroxide. After phosgenation is terminated 2 liters of methylene chloride are added, the brine layer is separated by centrifuge and the resin solution is washed with aqueous acid and with water. The resin is steam precipitated and dried in a nitrogen fluid bed at approximately 240° F. To this resin product are added minor amounts (about 0.1 part by weight per hundred parts by weight of resin) of a phosphite color stabilizer and an epoxy hydrolytic stabilizer. This stabilized resin product is then fed to an extruder operating at a temperature of about 600° F. to extrude the resin into strands and the extruded strands are chopped into pellets. The pellets are then injection molded at about 650° F. into test samples measuring about 2½"×½"×⅛".

EXAMPLE 3

The procedure of Example 2 is substantially repeated except that 76.4 grams (4 mole %) of the bischloroformate of 2,2-dimethyl propane diol are utilized in the ternary mixture.

Various physical properties of the resin and the molded samples obtained in Examples 1-3 were determined according to the following test procedures:

Heat Distortion Temperature Under Load (DTUL) of the molded samples was determined according to ASTM D-648, modified to use test samples described above;

Notched Izod (NI) impact on the molded samples was determined according to ASTM D-256;

Melt Index (MI) of the resin was determined according to modified ASTM D-1238, condition O;

the Intrinsic Viscosity (IV) of the resin was determined in methylene chloride at 25° C.;

the Glass Transition Temperature (Tg) was determined in degrees C.; and the Light Transmission of the molded samples, before and after autoclaving at 250° F., was determined according to ASTM D-1003.

The results of these tests are set forth in Table I.

As illustrated by the data in Table I the Melt Index of the resins of the instant invention, Examples 2 and 3, is substantially higher than the Melt Index of the prior art resins, Example 1. This higher Melt Index indicates reduced viscosity of the resin and, therefore, improved processability of the copolyester-carbonate resin. This improvement in processability is achieved without any substantial deterioration of the other advantageous physical properties of the copolyester-carbonate resin.

As stated above, the preferred method of preparation of the present copolyester-carbonates involves the reaction of a carbonyl halide such as phosgene with the dihydric phenol of Formula II and a dicarboxylic acid or its reactive derivative and the bishaloformate of Formula I. The proportion of carboxylate and carbonate groups present in the final polymer can be suitably varied by varying the molar ratio of the dihydric phenol to dicarboxylic acid or its reactive derivative. It is preferred that this molar ratio of dihydric phenol to dicarboxylic acid or its reactive derivative be more than 1, preferably in the range of from about 1.00:0.05 to about 1.00:0.70.

The foregoing detailed description has been given for clearness of understanding only and no unnecessary limitations are to be understood or implied therefrom. The invention is not limited to the exact details shown and described herein, for obvious modifications will occur to those skilled in the art.

What is claimed is:

1. A copolyester-carbonate resin composition exhibiting improved processability comprised of the polymerized reaction product of:
   (i) at least one dihydric phenol;
   (ii) a carbonyl halide carbonate precursor;
   (iii) at least one difunctional carboxylic acid or a reactive derivative thereof; and
   (iv) a processability improving amount of at least one bishaloformate represented by the formula

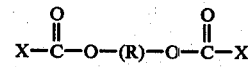

wherein X represents a halide radical and R represents an alkylene radical containing from 2 to about 20 carbon atoms.

2. The composition of claim 1 wherein said bishaloformate is present in an amount of from about One to about 10 mole percent, based on the amount of dihydric phenol present.

3. The composition of claim 2 wherein said alkylene radical is a straight chain alkylene radical.

4. The composition of claim 2 wherein said alkylene radical is a branched chain alkylene radical.

5. The composition of claim 4 wherein branching occurs at the beta carbon atom of said branched alkylene radical.

6. The composition of claim 2 wherein said difunctional carboxylic acid is an aromatic dicarboxylic acid.

7. The composition of claim 2 wherein said reactive derivative of said carboxylic acid is the diacid halide of an aromatic dicarboxylic acid.

8. The composition of claim 7 wherein said diacid halide is a diacid chloride.

9. The composition of claim 2 wherein said carbonyl halide is phosgene.

10. The composition of claim 8 wherein said carbonyl halide is phosgene.

11. The composition of claim 10 wherein said dihydric phenol is bisphenol A.

12. The composition of claim 11 wherein said diacid chloride is a mixture of terephthaloyl chloride and isophthaloyl chloride.

TABLE I

| Example No. | Intinsic Viscosity (deciliters/gm) | Melt Index Equilibration Time at 300° C. | | Notched Izod (ft.lb./in.) | DTUL (°C. at 264 psi) | Tg | % Light Transmitted | |
|---|---|---|---|---|---|---|---|---|
| | | 6 min. | 12 min. | | | | Initial | After Autoclaving for 96 hrs. at 250° F. |
| 1 | 0.533 | 0.731 | 0.779 | 6.56 | 163.3 | 188.1 | 87.9 | 81.1 |
| 2 | 0.519 | 0.795 | 0.837 | 6.51 | 163.0 | 185.3 | 85.9 | 78.8 |
| 3 | 0.526 | 0.993 | 0.992 | 6.46 | 156.4 | 180.8 | 86.3 | 82.4 |

The copolyester-carbonates of the instant invention generally have a weight average molecular weight in the range of from about 5,000 to about 200,000, preferably in the range of from about 10,000 to about 100,000, and more preferably in the range of from about 25,000 to about 50,000.

13. The composition of claim 12 wherein said alkylene radical is a beta branched alkylene radical.

14. The composition of claim 13 which further contains a phosphite color stabilizer.

15. The composition of claim 14 which further contains a epoxide hydrolytic stabilizer.

16. The composition of claim 15 which further contains a flame retardant.

17. The composition of claim 2 which further contains a flame retardant amount of at least one flame retardant compound.

18. The composition of claim 1 wherein said halide radical is the chloride radical.

19. The composition of claim 18 wherein said alkylene radical is a branched chain radical.

20. The composition of claim 19 wherein said branched chain alkylene radical is a beta branched alkylene radical.

21. The composition of claim 20 wherein said carbonyl halide is phosgene.

22. The composition of claim 21 wherein said dihydric phenol is bisphenol A.

23. The composition of claim 22 wherein said difunctional carboxylic acid is selected from isophthalic acid, terephthalic acid, and mixtures thereof.

24. The composition of claim 23 wherein said difunctional carboxylic acid is a mixture of isophthalic acid and terephthalic acid.

25. The composition of claim 22 wherein said reactive derivative of said difunctional carboxylic acid is selected from isophthaloyl chloride, terephthaloyl chloride, and mixtures thereof.

26. The composition of claim 25 wherein said reactive derivative of said difunctional carboxylic acid is a mixture of isophthaloyl chloride and terephthaloyl chloride.

27. The composition of claim 26 wherein said composition contains a stabilizing amount of a phosphite color stabilizer and a epoxide hydrolytic stabilizer.

28. The composition of claim 27 wherein said composition contains a flame retardant amount of a flame retardant compound.

* * * * *

UNITED STATES PATENT AND TRADEMARK OFFICE
CERTIFICATE OF CORRECTION

PATENT NO. : 4,381,358
DATED : April 26, 1983
INVENTOR(S) : Niles R. Rosenquist

It is certified that error appears in the above-identified patent and that said Letters Patent are hereby corrected as shown below:

Column 8, line 43  1,9101 grams should be 1,910 grams

*Signed and Sealed this*

*Eighteenth* Day of *June 1985*

[SEAL]

*Attest:*

DONALD J. QUIGG

*Attesting Officer*     *Acting Commissioner of Patents and Trademarks*